United States Patent [19]

Crews

[11] 4,421,545
[45] Dec. 20, 1983

[54] HIGH STRENGTH MELAMINE-UREA FERTILIZER GRANULES

[75] Inventor: George M. Crews, Baton Rouge, La.

[73] Assignee: Melamine Chemicals, Inc., Donaldsonville, La.

[21] Appl. No.: 339,201

[22] Filed: Jan. 13, 1982

[51] Int. Cl.³ .............................................. C05C 9/00
[52] U.S. Cl. ......................................... 71/30; 71/902; 71/64.05; 564/63; 428/402
[58] Field of Search ...................... 71/27–30, 71/902, 64.05; 564/2, 3, 63; 544/192; 23/313 R; 428/402; 260/555 B

[56] References Cited

U.S. PATENT DOCUMENTS 4,008,234 2/1977 Weinrotter et al. ............. 260/249.6

OTHER PUBLICATIONS

AN 17561 D/11, Wolf, 12-10-80-Abstract.

Primary Examiner—Ferris H. Lander
Attorney, Agent, or Firm—Mary E. Picken

[57] ABSTRACT

This invention relates to an improved annealing process for preparing melamine-urea fertilizer granular agglomerates having increased crush strength.

6 Claims, No Drawings

HIGH STRENGTH MELAMINE-UREA FERTILIZER GRANULES

BACKGROUND OF THE INVENTION

This invention relates to an improved process for making a granular fertilizer product having enhanced strength and suitable size and weight for mechanical dispensing and application to and into the soil. The basic process of making the granular fertilizer product is disclosed in the commonly assigned application of Allan et al., U.S. Ser. No. 305,603 filed on Sept. 25, 1981, the disclosure of which is expressly incorporated herein by reference. These granules combine fine melamine crystals with urea, binding the fine malamine crystals into a granular form.

There is a continuing search and need for improved fertilizer materials. For example, while ammonium nitrate, containing 34% N, still ranks second only to ammonia, 82% N, as a source of fertilizer nitrogen, its use generally has been decreasing in terms of market percentage, since 1965. The reason is increased use of the higher nitrogen content materials, ammonia, with 82% N, and urea, with 46% N, respectively. The use of urea is a development of recent years, and may have been prompted in part by a desire to reduce shipping costs.

All of these nitrogen fertilizer materials; ammonia, ammonium nitrate and urea, are readily soluble in water. They are therefore subject to leaching, and their use results in a rapid release of their nitrogen. Since this necessitates repeated applications for sustained growth, or one application with higher leaching losses, there have been many developments relating to slow release nitrogen fertilizer materials. Generally such materials sacrifice nitrogen content for some degree of control over nitrogen availability.

Melamine and its hydrolysis products, ammeline, ammelide, and cyanuric acid, have often been considered as potential sources of nitrogen for incorporation in fertilizer compositions or for utilization as nitrogen sources per se. Melamine with 66.6% N would provide substantial amounts of nitrogen. However, at present it is more expensive than urea. Moreover, commercially produced melamine is available only as a fine crystalline powder. It is manufactured in the form of very fine crystals because small size particles are required for the present commercial end markets for melamine, such as, for example, the production of melamine-formaldehyde resins and the production of fire retardant paints.

A typical screen analysis for one commercially available melamine, conducted with United States Standard Sieve screens, is as follows:

| Screen Analysis | Percent Retained |
| --- | --- |
| 40 mesh | 0–0.1 |
| 40–50 mesh | 0–0.1 |
| 50–60 mesh | 0–0.3 |
| 60–80 mesh | 0.5–5.0 |
| 80–100 mesh | 1.0–5.0 |
| 100–200 mesh | 13–30 |
| 300–325 mesh | 13–30 |
| Through 325 mesh | 40–60 |

The commercially-produced small melamine crystals are desired by the resin producers because the small crystals dissolve more readily, and any larger particles, if present, would tend to require a longer processing time; therefore, the larger particles are less desirable. In the fire retardant paint market, the melamine crystals are dispersed in the paint, where the current fine particle sizes produce a smoother texture in the dried paint than would larger particles. The fine particle sizes of the commercially available melamine products make melamine a product that is not very attractive for agricultural applications.

Moreover, the fine particle sizes of commercial melamine as currently produced, make it impractical to use as a fertilizer material. The fine particles, if applied to the surface of the ground, would be blown away by even mild winds. If applied by air, as from an airplane or helicopter, drifting would be a serious problem and would cause uneven application. If applied through mechanical applicators, the fine particles would tend to form bridges and thus would plug transfer and dispensing lines. These difficulties in handling the commercially available melamine solids would make any large scale agricultural application impractical.

Past investigations into the possible use of melamine as a fertilizer nitrogen have generally been on a small scale where the limitations imposed by the fine particle size of melamine were not a serious obstacle. In most cases negative results were obtained. Because of these reported negative or equivocal results, little work has been done that has been concerned with the physical forms of melamine. On the contrary, past work has addressed the question of whether melamine and its salts are in fact useful sources of nitrogen and in general, the most frequent conclusion reached was that they were not. Consequently, apparently no one to date has taken the further step of trying to place these materials in a phyical form that would seek to optimize their performance if used.

Wolf, in West German Pat. No. 926,853 in 1954, suggested the use of the melamine-formaldehyde resins as binding agents for granular fertilizer compositions also containing spent sulfite liquor and super phosphate. No field trials were reported in the patent.

In 1964, Hauck and Stephenson published an article in Agricultural and Food Chemistry 12, 147–151, describing the rate at which symmetrical triazines converted in the soil to a form useful to plants. For evaluation, melamine phosphate and melamine nitrate were recrystallized, respectively, washed, and dried. What the authors refer to as granules of melamine, acid, and metal ion were prepared by forming dried pastes of the several materials, then crushing and screening the product to pass −8+12 mesh. Such materials included mixtures, for example, of melamine and phosphoric acid, melamine and nitric acid, and melamine and ferric ammonium sulfate. In addition, the performances of melamine, ammeline, ammelide, and cyanuric acid were evaluated in silty clay loam in practice form while melamine and cyanuric acid were also evaluated as solutions. Although some degradation of all was observed, the authors pointed out that melamine and cyanuric acid powders degraded at a faster rate than either granules having sizes in the range from −8+12 mesh, or solutions. The authors concluded with what appears to be a very negative observation, that the evaluation of these materials as slow-release nitrogen sources should be made only on crops that are expected to respond to small amounts of nitrogen added at frequent intervals.

In 1976, East German Pat. No. 120,645 to Wolf described the use of a polymer coating on prilled urea to provide a slow-acting fertilizer. Prills having an average particle diameter of 1.7 mm were pretreated with a coating substance or solution, dried, fluidized, and then coated with a latex polymer at 60° C. Melamine was mentioned as one of the possible pretreating substances. The coated pellets had particle sizes in the range from 0.5–5 mm, preferably in the 1–3 mm range.

U.S. Pat. No. 3,705,019 describes the production of granular cyanuric acid from fine cyanuric acid powder particles, to produce fast dissolving granules for treating the water in swimming pools. It has nothing to do with fertilizer.

Subsequently, Corte et al. in U.S. Pat. No. 4,083,712 produced nitrogenous fertilizers in the form of salts of a cation exchange resin. These fertilizers were in the form of beads, granulates or powders. In Example 3 of the patent, a sulfonated polystyrene cross-linked with divinyl benzene, in the hydrogen form and strongly acidic, was reacted with an aqueous suspension of melamine. The reaction product was said to consist of 100 ml of a nitrogenous fertilizer containing 2.2 moles of melamine per liter. This material, and other ion exchange resin salts produced from guanidine and other nitrogen compounds, were tested over a two year period with grass in pots of loamy sandy soil which had received a basic dressing of phosphorus and potash.

In what appears to be a subsequent development, described in South African Pat. No. 735,583, Corte and his associates pursued their investigations further. More work is described with nitrogenous fertilizer salt compositions comprising a cation exchange resin having a nitrogen base such as melamine chemically bound thereto. The cation exchanger optionally may be partially charged with a material such as melamine, and partially with inorganic nutrient ions.

Both of these patents of Corte et al. point out that certain slow release nitrogen sources, such as urea-formaldehyde resins, have been combined with a short term nitrogen fertilizer material, such as a nitrate, to provide a greater initial fertilizing effect. Corte et al. observed, however, that melamine, unless chemically reacted to become the salt of an ion exchange resin, was "unsuitable for fertilizing purposes", U.S. Pat. No. 4,083,712, col. 2, lines 58–61.

The commonly assigned application Ser. No. 305,603 describes the composition and process of making of a melamine urea granule or prill. However, none of these authors described the annealed high strength melamine-urea granules of the present invention.

DETAILED DESCRIPTION OF THE INVENTION

Melamine crystals are combined with urea powder to form agglomerates using a disk pelletizer and a water or urea solution spray. When an aqueous solution of urea is used it may be very dilute or as concentrated as a saturated solution of urea in water. When the saturated solution is used about 7% urea is added to the dried agglomerate composition. Thus when the composite contains 67 parts melamine crystal, 33 parts urea powder and an additional 7 parts urea derived from the saturated solution the final proportion is 67 parts melamine to 40 parts urea. Melamine crystals may be obtained from any commercial source. The fine white crystalline powder from one source has the following screen analysis as measured on United States Standard Sieve screens:

| Screen Analysis | Percent Retained |
| --- | --- |
| 40 mesh | 0–0.1 |
| 40–50 mesh | 0–0.1 |
| 50–60 mesh | 0–0.3 |
| 60–80 mesh | 0.5–5.0 |
| 80–100 mesh | 1.0–5.0 |
| 100–200 mesh | 13–30 |
| 200–325 mesh | 13–30 |
| Through 325 mesh | 40–60 |

The urea may also be obtained from any commercial source and is used as a powder.

In one preferrd agglomeration technique 67 parts by weight melamine crystal are blended with 33 parts by weight urea powder. This blend is then sprayed with water in an agglomerating device such as a pelletizer. In the water spray the urea becomes moistened and tacky, coating the powdery melamine particles sufficiently to cause agglomeration to occur. A small amount of melamine crystal dust may be added to the surface of the formed agglomerates. The agglomerates are then dried at a suitable temperature. This maximum temperature is determined by the amount of water used in preparing the agglomerates. If the maximum temperature is exceeded the urea melts and the agglomerates become fluid and non-particulate. The maximum temperatures for the drying step permitted at each water level of the melamine/urea mixture are set forth in Table I.

TABLE I

| MAXIMUM TEMPERATURES IN DRYING STEP | |
| --- | --- |
| % $H_2O$ In Melamine/Urea Mixture | Temperature °F./°C. |
| 0 | 259/126 |
| 3 | 215/102 |
| 6 | 169/76 |
| 10 | 109/43 |

The subsequent annealing step requires heating in an oven above 259° F. (126° C.). After annealing, the crush strength of agglomerates of 2 mm to 3 mm particle size was 1400 to 1500 grams. When dried samples were tested which had not been further heated or annealed the crush strength of agglomerates of 2 mm to 3 mm particle size was only about 450 grams.

In a preferred embodiment this is a method for preparing a melamine/urea granular agglomerate adapted for use as a source of nitrogen for fertilizing applications which comprises intimately mixing from 60 to 85 parts by weight melamine crystals and correspondingly from 40 to 15 parts of urea powder, contacting said mixture with a spray of water or an aqueous solution of urea, agglomerating the moistened mixture to form predominantly agglomerates having a nominal size of from 1 mm to 10 mm, drying the agglomerates at less than 200° F. (93° C.), and annealing the dried agglomerates by heating between 258° F. and 300° F. (135° C. and 149° C.).

In a more preferred embodiment the intimate mixture is made from 67 parts melamine crystal and 33 parts urea powder. In this embodiment ten randomly selected agglomerates having 3 mm and 4 mm sizes have an average crush strength of at least 1300 grams.

In the most preferred embodiment the melamine/urea mixture is contacted with a spray of water. The most preferred embodiment method further requires applying melamine crystal dust to the formed agglomerates before the drying step and an annealing step of heating at 290° F. (142° C.). The time required for the annealing step will depend on the type of oven or dryer used; in a conventional laboratory oven at 290° F. (142° C.) the annealing step requires heating for 8 to 15 minutes.

The present invention will be better understood by reference to the following examples. Throughout this application and in these examples, all references to parts and percentages are by weight, and all references to temperatures are in degrees Celsius, unless expressly stated otherwise.

EXAMPLES OF GRANULE FORMATION

In all of the following examples, the melamine used was the commercially available product of Melamine Chemicals, Inc., Donaldsonville, LA. It was a fine white crystalline powder having a screen analysis substantially as reported above for commercially available melamine. It was about 99.9% pure, with specifications of a maximum moisture content of 0.1%, maximum ash of 0.01%, and a density of about 1.57 g/ml.

As is pointed out in some of the following examples, crush strengths of 1350 or greater are preferred. More preferably crush strengths of 2400 or more are developed, to facilitate application. Also, the bulk density of the granules should be 40 lbs/ft³ (640.8 kg/m³) or more. The preferred combination of bulk density, crush strength, and particle size makes for flexibility in and ease of application.

The first example illustrates the preparation of melamine/urea agglomerates without the annealing treatment and having low crush strength values.

EXAMPLE 1

Melamine Agglomerates Using a Urea Binder

A batch of granules was prepared using 67 parts of melamine crystals and 33 parts urea. The granules were made on an 18 inch disc pelletizer. The urea was first ground, then blended with the melamine to form a homogeneous mixture. This mixture was fed to the pelletizer and sprayed with water. The granules were dried at 200° F. (94° C.) for about 20 minutes.

Crush strength was determined by randomly selecting ten granules of 3 to 4 mm in diameter from each batch, and subjecting each of these ten granules to pressure until crushing occurred. The ten values were averaged, and the average value is that reported in Table II below. Granules were also dropped into a beaker of water. The time was recorded at which the granules started to break apart.

The following example illustrates the annealing step of the present invention which provides improved crush strength values.

EXAMPLE 2

Annealed Melamine Granules

Granules prepared according to the procedure of Example 1 were subjected to a further step of heating to 290° F. (149° C.) for 3 minutes. After cooling, the crush strength and rate of breaking apart in water were measured. These values are reported in Table II below.

TABLE II

| | Crush Strength (grams) | Time to Disintegration in Water |
|---|---|---|
| Example 1 Dried Granules | 600 | immediate |

TABLE II-continued

| | Crush Strength (grams) | Time to Disintegration in Water |
|---|---|---|
| Example 2 Annealed Granules | 2400 | 20 to 30 seconds |

This example illustrates the relationship between time and temperature in the annealing step.

EXAMPLE 3

Annealed Melamine Granules

Melamine granules prepared according to Example 1 were heated in separate batches at 230° F. (104° C.), 290° F. (149° C.) and 340° F. (172° C.) for varying times. A standard laboratory oven was used. After cooling, the crush strength was measured. The results appear in Table III. The maximum crush strength at 340° F. (172° C.) appears at 6 minutes heating. The maximum crush strength appears at 290° F. (149° C.) at 11 minutes heating.

Shorter drying times and annealing times will be possible in production when forced air dryers or ovens will be used in place of the laboratory oven used in these examples.

TABLE III

| Oven Temperature °F. (°C.) | Minutes Heating | Crush Strength (grams) |
|---|---|---|
| 230 (140° C.) | 20 | 560 |
| 290 (149° C.) | 4 | 350 |
| | 5 | 881 |
| | 6 | 978 |
| | 7 | 1333 |
| | 8 | 1290 |
| | 9 | 1530 |
| | 10 | 1480 |
| | 11 | 1780 |
| | 12 | 1300 |
| | 13 | 1640 |
| | 14 | 1445 |
| | 15 | 1530 |
| | 20 | 1454 |
| 340 (172° C.) | 4 | 763 |
| | 5 | 1125 |
| | 6 | 1340 |
| | 7 | 1200 |
| | 8 | 825 |

I claim:

1. A method for preparing a melamine/urea granular agglomerate adapted fo use as a source of nitrogen for fertilizing applications consisting of:
   forming a mixture of from 60 to 85 parts by weight melamine crystals and correspondingly from 40 to 15 parts of urea powder,
   contacting said mixture with a spray of water or an aqueous solution of urea,
   agglomerating the moistened mixture to form predominantly agglomerates having a nominal size of from 1 mm to 10 mm,
   drying the agglomerates at less than 93° C.,
   annealing the dried agglomerates by heating between 135° C. and 149° C., and
   cooling the agglomerates whereby annealed melamine-urea fertilizer agglomerates are provided having increased crush strength.

2. The method of claim 1 wherein the mixture comprises 67 parts by weight melamine crystals and correspondingly 33 parts by weight urea powder.

3. The method of claim 1 wherein ten randomly selected annealed agglomerates having 3 mm to 4 mm sizes, have an average crush strength of at least 1300 grams.

4. The method of claim 1 wherein said annealing step requires heating at 142° C.

5. The method of claim 1 further comprising, after forming the melamine urea agglomerates and prior to drying the agglomerates:

applying melamine crystal dust to the formed agglomerates.

6. The method of claim 1 wherein said spraying step comprises spraying the urea melamine mixture with water.

* * * * *